(12) United States Patent
Drouart et al.

(10) Patent No.: US 6,178,779 B1
(45) Date of Patent: Jan. 30, 2001

(54) BUTT WELDING OPTICAL FIBER PREFORMS WITH A PLASMA TORCH

(75) Inventors: Alain Drouart, Nanterre; Pierre Ripoche, Pithiviers; Bernard Wurier, Valmondois, all of (FR)

(73) Assignee: Alcatel, Paris (FR)

( * ) Notice: Under 35 U.S.C. 154(b), the term of this patent shall be extended for 0 days.

(21) Appl. No.: 09/280,826

(22) Filed: Mar. 30, 1999

(30) Foreign Application Priority Data

Apr. 9, 1998 (FR) .................................................. 98 04432

(51) Int. Cl.[7] .................................................. C03B 37/012
(52) U.S. Cl. .................. 65/391; 65/407; 65/272; 65/57; 65/36
(58) Field of Search .............................. 65/407, 272, 392, 65/391, 57, 36, 41

(56) References Cited

U.S. PATENT DOCUMENTS

| 2,595,555 | * | 5/1952 | Wolf | 65/36 |
|---|---|---|---|---|
| 3,619,158 | * | 11/1971 | Akhunov | 65/272 |
| 3,728,186 | * | 4/1973 | Mohn | 65/36 |
| 3,810,748 | * | 5/1974 | Matuzawa | 65/272 |
| 4,195,980 | * | 4/1980 | Sterling | 65/392 |
| 4,561,874 | | 12/1985 | Colacello et al. . | |
| 5,158,589 | | 10/1992 | Curtis et al. . | |
| 5,221,306 | * | 6/1993 | Fleming . | |

FOREIGN PATENT DOCUMENTS

| 00 623 563 A1 | 11/1994 | (EP) . | |
|---|---|---|---|
| 0 656 325 A1 | 6/1995 | (EP) . | |
| 2 081 251 | 2/1982 | (GB) . | |
| 1182010 | * 9/1985 | (SU) | 65/36 |
| 1488264 | * 6/1989 | (SU) | 65/36 |

* cited by examiner

Primary Examiner—John Hoffmann
(74) Attorney, Agent, or Firm—Sughrue, Mion, Zinn, Macpeak & Seas, PLLC

(57) ABSTRACT

The invention relates to a method of assembling two optical fiber preforms together end-to-end, the method comprising the following operations:

the two cylindrical preforms are placed in alignment along a common longitudinal axis;

the preforms are rotated about the common longitudinal axis;

the facing ends of said preforms are heated by a heater; and the preforms are moved towards each other parallel to the common axis to press them against each other so as to form intimate contact between the ends after cooling. According to the invention, the heating is performed by causing the preforms or heater to move in a radial direction orthogonal to the common longitudinal axis in such a manner as to heat the peripheries and then the cores of said preforms.

8 Claims, 2 Drawing Sheets

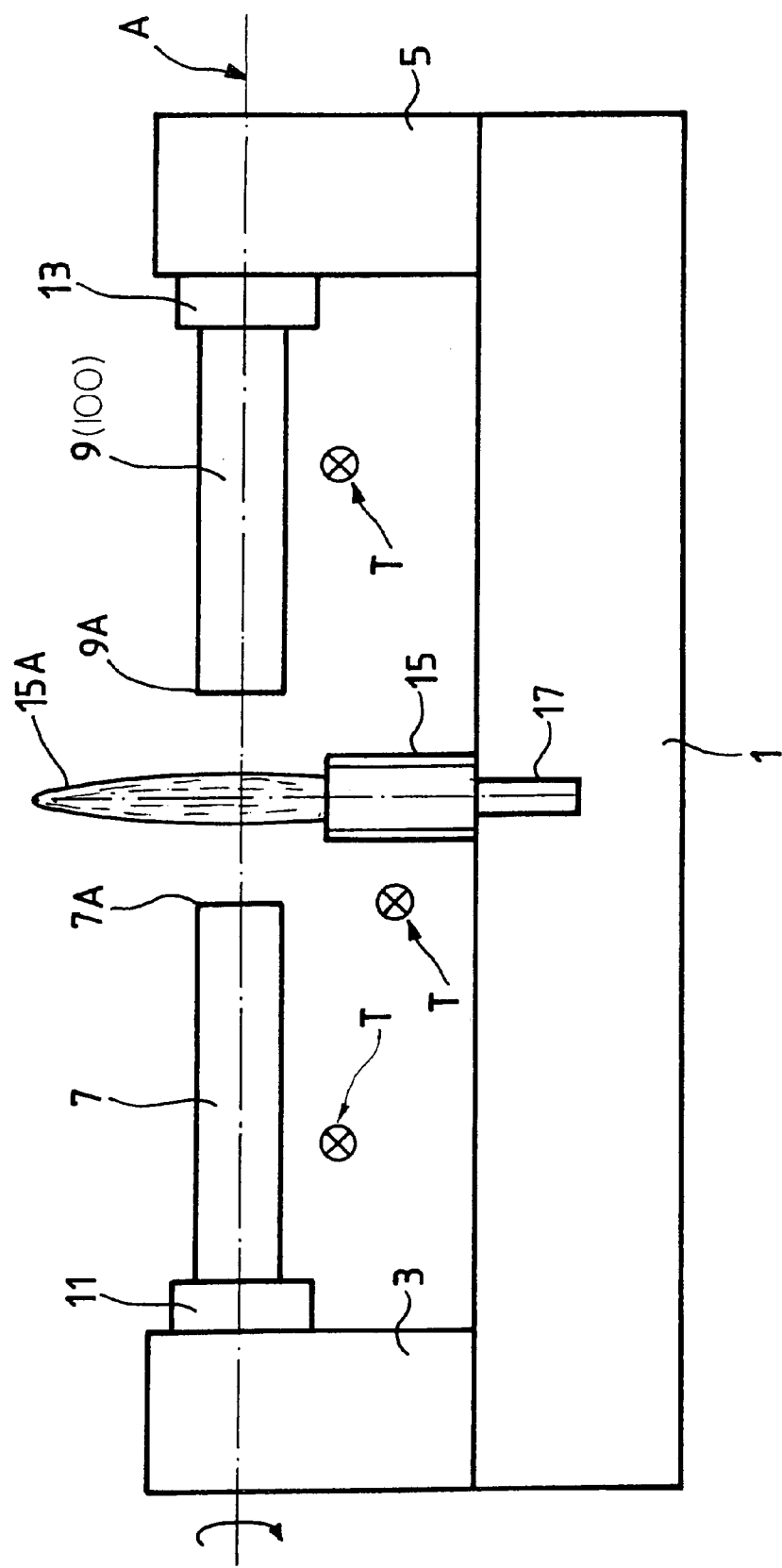
FIG_1

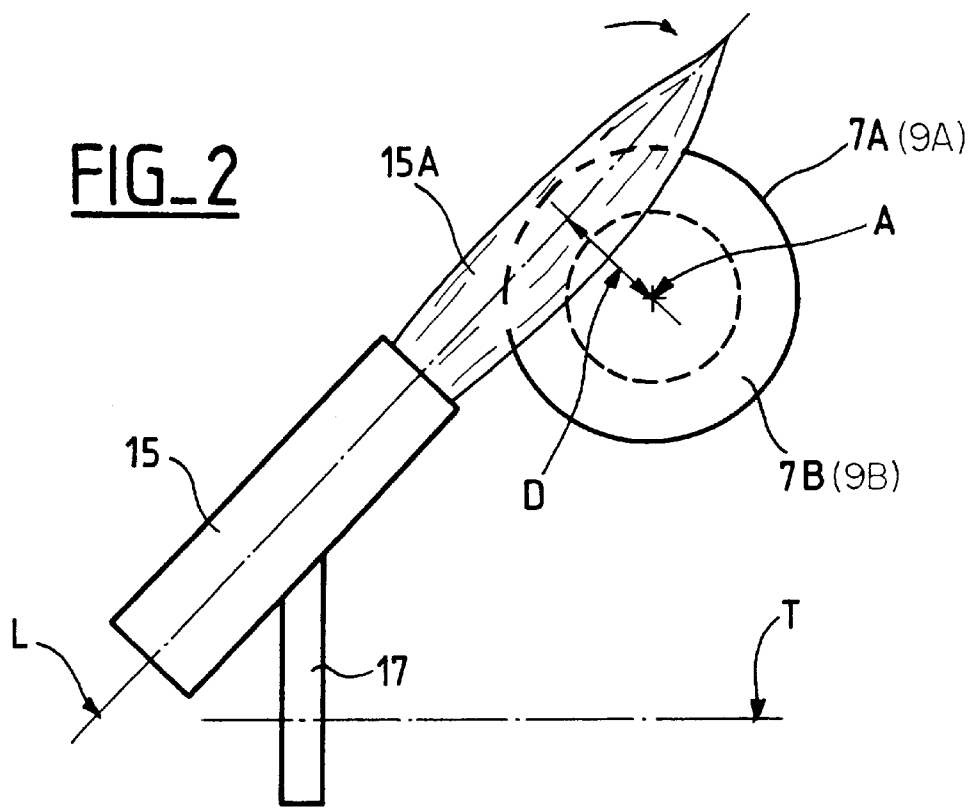
FIG_2
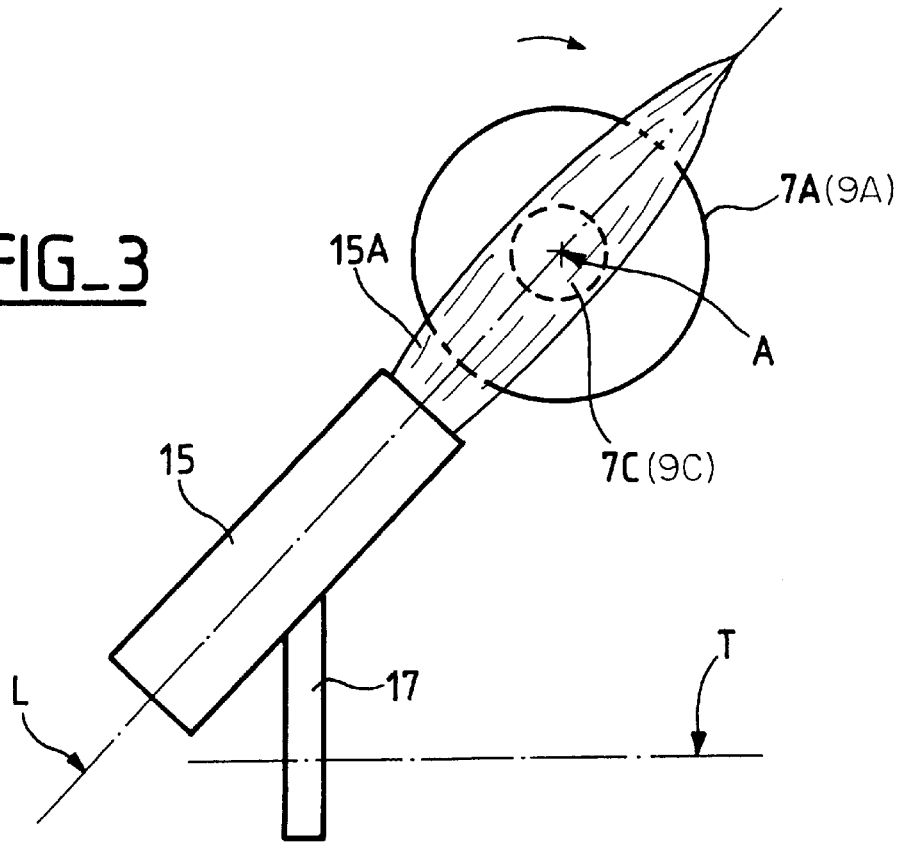
FIG_3

BUTT WELDING OPTICAL FIBER PREFORMS WITH A PLASMA TORCH

The invention relates to a method of assembling two optical fiber preforms end-to-end, in which:

the two cylindrical preforms are placed on a common axis;

the two preforms are rotated about the axis;

the facing ends of the two preforms are heated; and the two preforms are moved towards each other parallel to the axis so as to press them against each other, thereby forming intimate contact between the heated ends after they have cooled.

BACKGROUND OF THE INVENTION

Such a method is known in particular from German patent application DE-29 32 196. In that application, the preforms to be assembled typically have a length and a diameter of 300 mm and 10 mm, respectively. The heating means used is a blow torch, or a resistance oven, or indeed a laser. The cylindrical preforms are rotated about their axis to ensure that heating is uniform around the periphery of each end.

Nowadays, the preforms used have a diameter that lies typically in the range 100 mm to 170 mm, so as to increase the length of optical fiber that can be drawn therefrom.

Assembling such preforms together requires heating power that is much greater than that required for preforms that are 10 mm in diameter, given that the volume of material that needs to be softened varies with the square of the diameter. In addition, heat must be delivered in such a manner that the material softens in substantially uniform manner throughout the heated volume at each end; this is particularly critical since the periphery and the core of the preform do not have the same melting temperature, with the periphery of the preform generally containing no doping elements, whereas the core does contain doping elements.

OBJECTS AND SUMMARY OF THE INVENTION

An object of the invention is thus to develop a method of assembling end-to-end two large-diameter optical fiber preforms of non-uniform radial composition.

To this end, the invention provides a method of assembling two optical fiber preforms end-to-end, the method comprising the following operations:

the two cylindrical preforms are placed in alignment along a common longitudinal axis;

said preforms are rotated about said common longitudinal axis;

the facing ends of said preforms are heated by heater means; and said preforms are moved towards each other parallel to said common axis to press them against each other so as to form intimate contact between said ends after cooling;

wherein said heating is performed by causing said heater means to move relative to said ends in a radial direction orthogonal to said common longitudinal axis in such a manner as to heat the peripheries and then the cores of said preforms.

By displacing the heater means radially in front of each end from the peripheries towards the centers of the preforms, heating begins with layers that have a relatively high melting temperature because of the absence of doping elements, and continues with the core layers that have a lower melting temperature because of the presence of dopants.

In this way, the volume heated at each end is softened in substantially uniform manner, thereby making it possible to butt weld the two preforms together while preventing any flow of the more meltable material while the two preforms are being pressed together. This gives rise to a uniform weld which ensures that the portion of fiber drawn from the weld zone conserves the same mechanical and optical properties as the remainder of the drawn fiber.

Advantageously, the heater means comprise a plasma torch. The plasma torch generates a soft flame which is both hot and focused. Plasma torch heating also makes it possible to vaporize a surface layer of material from each preform end. This thus eliminates a prior operation of cleaning by means of chemical agents. It is preferable to use a clean plasma-generating gas to avoid polluting each end.

The invention also applies to assembling a preform with a glass endpiece. Under such circumstances, the invention provides a method of assembling an optical fiber preform and a cylindrical endpiece of vitreous material end-to-end, the method comprising the following operations:

said cylindrical preform and said endpiece are placed in alignment along a common longitudinal axis;

said preform and said endpiece are rotated about said common longitudinal axis;

the facing ends of said preform and of said endpiece are heated by heater means; and said preform and said endpiece are moved towards each other parallel to said common axis to press them against each other so as to form intimate contact between said ends after cooling;

wherein said heating is performed by causing said heater means to move relative to said ends in a radial direction orthogonal to said common longitudinal axis so as to heat the periphery of said preform initially and then heat the core of said preform and said endpiece.

BRIEF DESCRIPTION OF THE DRAWINGS

Other characteristics and advantages of the invention will appear on reading the following description of an implementation shown in the drawings. In the following figures:

FIG. 1 is a diagram showing apparatus for implementing the method of the invention to assemble two optical fiber preforms together, end-to-end;

FIG. 2 is a diagram showing a plasma torch occupying a first position that is offset from the axis of rotation of the preforms to heat peripheral zones at the ends of the preforms; and FIG. 3 is a diagram showing a plasma torch occupying a second position enabling central zones of the ends of the preforms to be heated.

MORE DETAILED DESCRIPTION

A method of assembling performs end-to-end is implemented by apparatus which comprises, as shown in FIG. 1, a horizontal glassmakers' lathe 1 having and two chucks 11 and 13 mounted on two supports 3 and 5. The two chucks rotate two cylindrical preforms 7 and 9 about a common axis A. The welding apparatus is installed in ambient air.

The facing ends 7A and 9A of the two preforms 7 and 9 are heated in order to be softened. The support 3 moves in translation parallel to the axis of rotation A to move the preform 7 towards the other preform 9 and to press the two softened ends 7A and 9A together so that an intimate weld is formed between them after they have cooled.

According to the invention, a plasma torch 15 is mounted in fixed manner on an arm 17 which slides relative to the horizontal lathe 1 in a direction T which is perpendicular to the axis of rotation A so as to move the plasma torch 15 in translation in front of the two ends 7A and 9A of the preforms.

In the embodiment shown in the figures, the plasma torch 15 is movable in a plane perpendicular to the axis of rotation A by means of the sliding arm 17, and it extends in a longitudinal direction L which is inclined at 45° relative to the horizontal lathe 1.

During heating, the plasma torch 15 is moved by the sliding arm 17 so that it initially occupies a position shown in FIG. 2 where it is offset from the axis of rotation A of the two preforms. The shifting of the plasma torch is represented in the figure by a distance D between the axis of rotation A and the longitudinal axis L of the plasma torch 15 on which a flame 15A is focused. The torch 15 is held in this position for as long as is required to soften the volume heated by the flame 15A in a peripheral zone 7B or 9B of the end of the preform 7 or 9.

Subsequently, the plasma torch 15 is moved by means of the sliding arm 17 so as to occupy a position as shown in FIG. 3 where the longitudinal axis L of the torch intersects the axis of rotation A. The torch is maintained in this position for as long as is required to soften the volume heated by the flame 15A in a central zone 7C or 9C at the end of the preform 7 or 9.

The core of each preform is constituted by silica that has been doped, for example with germanium, and its melting temperature is lower than that of the peripheral layers which are constituted by silica that does not contain germanium. Two-stage heating obtained by moving the plasma torch in translation from the periphery towards the center of the ends of the two preforms brings the peripheral layer 7B to the same degree of softening as the core layer 7C. This prevents any flow of the zone that melts at lower temperature relative to the zone that melts at higher temperature, thereby ensuring that the weld is uniform in character. As mentioned above, the portion of fiber that is drawn from the weld zone thus conserves the same mechanical and optical properties as the lengths of fiber that are obtained from preform zones that are not affected by the weld.

During heating, the heat power of the plasma torch also serves to vaporize a surface layer of material from the ends that are to be assembled together. It is therefore not necessary to apply chemical treatment for preparing the ends, e.g. treatment with a strong acid. The plasma-generating gas used in the plasma torch is preferably free from any impurities so as to avoid polluting the heated ends.

After the preform 7 has moved towards the preform 9 (for example) and the two ends 7A and 9A have been put into contact with pressure, the plasma torch 15 is put out. A bulge formed at the joint between the two preforms is shaped by means of a graphite blade.

A non-polluting thermally-insulating jacket is placed around the two preforms on either side of the weld, e.g. a jacket of silica wool, for the purpose of slowing down cooling, or an oven is used that is placed around the two preforms to control the rate of cooling. In either case, the appearance of thermal stresses is avoided. For the same reason, provision is also made to unlock one of the two preforms from its chuck.

In the implementation described above, the plasma torch 15 is movable in translation T relative to the axis of rotation A of the lathe 1 which is fixed. Provision may also be made to mount the torch 15 in a fixed position relative to the lathe 1 and to move the preforms 7 and 9 in translation T by means of supports 3 and 5 each of which has two degrees of freedom in a plane perpendicular to the axis of rotation A.

Advantageously, the invention is applied to assembling a preform to a cylindrical glass endpiece 100 of diameter that is equal to or less than that of the preform, e.g. 40 mm as compared with a preform diameter lying in the range 100 mm to 170 mm. In this application, the peripheral layers of the end of the preform are heated initially and the core of the preform and the end of the endpiece are heated subsequently.

What is claimed is:

1. A method of assembling two optical fiber preforms end-to-end, the method comprising the following operations:

the two cylindrical preforms are placed in alignment along a common longitudinal axis;

said preforms are rotated about said common longitudinal axis;

the facing ends of said preforms are heated by a heater; and said preforms are moved towards each other parallel to said common axis to press them against each other so as to form intimate contact between said ends after cooling, wherein said heating is performed by causing relative movement between said heater and said ends in a radial direction orthogonal to said common longitudinal axis in such a manner as to heat the peripheries and then the cores of said preforms.

2. A method according to claim 1, wherein said heater comprises a plasma torch.

3. A method according to claim 2, wherein the plasma torch is fed with a plasma-generating gas that is free from impurities.

4. A method of assembling an optical fiber preform and a cylindrical endpiece of vitreous material end-to-end, the method comprising the following operations:

said cylindrical preform and said endpiece are placed in alignment along a common longitudinal axis;

said preform and said endpiece are rotated about said common longitudinal axis;

the facing ends of said preform and of said endpiece are heated by a heater; and said preform and said endpiece are moved towards each other parallel to said common axis to press them against each other so as to form intimate contact between said ends after cooling, wherein said heating is performed by causing relative movement between said heater and said ends in a radial direction orthogonal to said common longitudinal axis so as to heat the periphery of said preform initially and then heat the core of said preform and said endpiece.

5. A method according to claim 4, wherein the heater is movable in a direction perpendicular to said axis of rotation.

6. A method according to claim 4, wherein the preform and the endpiece are movable in a direction perpendicular to the axis of rotation.

7. A method according to claim 1, wherein the heater is movable in a direction perpendicular to said axis of rotation.

8. A method according to claim 1, wherein the preforms are movable in a direction perpendicular to said axis of rotation.

* * * * *